(12) United States Patent
Tanenbaum et al.

(10) Patent No.: US 10,141,968 B2
(45) Date of Patent: Nov. 27, 2018

(54) DEVICE FOR REFLECTING, DEFLECTING, AND/OR ABSORBING ELECTROMAGENTIC RADIATION EMITTED FROM AN ELECTRONIC DEVICE AND METHOD THEREFOR

(71) Applicant: ROWTAN TECHNOLOGIES LLC, Lewes, DE (US)

(72) Inventors: William Charles Tanenbaum, Beverly Hills, CA (US); Roger Kenneth Tanenbaum, Beverly Hills, CA (US)

(73) Assignee: ROWTAN TECHNOLOGIES, LLC, Lewes, DE (US)

(*) Notice: Subject to any disclaimer, the term of this patent is extended or adjusted under 35 U.S.C. 154(b) by 0 days.

(21) Appl. No.: 15/721,525

(22) Filed: Sep. 29, 2017

(65) Prior Publication Data

US 2018/0034493 A1 Feb. 1, 2018

Related U.S. Application Data

(60) Provisional application No. 62/368,397, filed on Jul. 29, 2016.

(51) Int. Cl.
*H04B 1/3827* (2015.01)
*H04B 1/03* (2006.01)
*H04M 1/02* (2006.01)

(52) U.S. Cl.
CPC ................. *H04B 1/3838* (2013.01)

(58) Field of Classification Search
CPC ....... H04B 1/3838; H04B 1/03; H04M 1/035; H04M 1/0283
See application file for complete search history.

(56) References Cited

U.S. PATENT DOCUMENTS

| 5,338,896 A | 8/1994 | Danforth |
| 5,550,552 A | 8/1996 | Oxley |
| 5,726,383 A | 3/1998 | Geller et al. |
| 5,777,261 A | 7/1998 | Katz |
| 5,787,340 A | 7/1998 | Sepponen |
| 5,826,201 A | 10/1998 | Gratias |
| 6,359,213 B1 | 3/2002 | Long |
| 6,576,832 B2 | 6/2003 | Svarfvar et al. |
| 6,603,981 B1 | 8/2003 | Carrillo, Jr. et al. |
| 6,711,387 B1 | 3/2004 | Lungley |
| 6,855,883 B1 | 2/2005 | Matsui |
| 7,327,841 B2 | 2/2008 | Schreiber et al. |
| 8,208,980 B2 | 6/2012 | Wong et al. |
| 8,214,003 B2 | 7/2012 | Wong et al. |
| 8,442,602 B2 | 5/2013 | Wong et al. |
| 8,750,948 B2 | 6/2014 | Wong et al. |

(Continued)

FOREIGN PATENT DOCUMENTS

WO 1997049191 12/1997

*Primary Examiner* — Andrew Wendell
(74) *Attorney, Agent, or Firm* — Paul B. Heynssens Attorney at Law, PLC

(57) ABSTRACT

A device for reflecting radio frequency (RF) radiation away from a user of a mobile phone has a metallic plate configured to be positioned between the mobile phone and a decorative and/or protective cover. The metallic plate is positioned over a rear surface of the mobile phone. The metallic plate is removable and non-permanently attached to the mobile phone and the decorative and/or protective cover.

20 Claims, 4 Drawing Sheets

(56) References Cited

U.S. PATENT DOCUMENTS

| | | | |
|---|---|---|---|
| 8,897,843 B2 | 11/2014 | Wong et al. | |
| 8,957,813 B2 | 2/2015 | McCaughey et al. | |
| 9,112,584 B2 | 8/2015 | McCaughey et al. | |
| 9,472,841 B2 | 10/2016 | Wong et al. | |
| 2002/0009976 A1 | 1/2002 | Rashidi | |
| 2010/0234081 A1* | 9/2010 | Wong | H01Q 1/243 455/575.5 |
| 2011/0021255 A1* | 1/2011 | Kim | H01Q 1/242 455/575.1 |
| 2012/0242549 A1 | 12/2012 | Wong et al. | |
| 2012/0309472 A1 | 12/2012 | Wong et al. | |
| 2014/0228081 A1* | 8/2014 | Chang | H04B 1/3888 455/575.8 |
| 2016/0072933 A1* | 3/2016 | Cox, III | H04M 1/185 455/575.8 |
| 2016/0309010 A1* | 10/2016 | Carnevali | H04B 1/3888 |
| 2016/0360652 A1 | 12/2016 | McConnell | |
| 2017/0134065 A1* | 5/2017 | Cramer | H04B 1/3888 |
| 2017/0207811 A1* | 7/2017 | Brisco | H04B 1/3888 |

* cited by examiner

DEVICE FOR REFLECTING, DEFLECTING, AND/OR ABSORBING ELECTROMAGENTIC RADIATION EMITTED FROM AN ELECTRONIC DEVICE AND METHOD THEREFOR

RELATED APPLICATIONS

This patent application is related to U.S. Provisional Application No. 62/368,397 filed Jul. 29, 2016, entitled "A POWDER-COATED THREE-INCH BY TWO-INCH PIECE OF COPPER THAT DEFLECTS AND ABSORBS ELECTROMAGNETIC RADIATION EMITTED FROM CELLPHONES" in the name of the William Charles Tanenbaum and Roger Kenneth Tanenbaum, which is incorporated herein by reference in its entirety. The present patent application claims the benefit under 35 U.S.C § 119(e).

TECHNICAL FIELD

The present application relates generally to the technical field of electronic devices, and more specifically, to the technical field of a portable device that is positioned between a mobile phone and a decorative and/or protective back cover and/or case that reflects and/or deflects electromagnetic radiation emitted from the mobile phone to the user.

BACKGROUND

Mobile phones have become an integral part of most individual lives. According to the Pew Research Center in Jan. of 2017, 95% of all individuals in the United States own some type of mobile phone. The share of Americans that own smartphones is now 77%, up from just 35% in Pew Research Center's first survey of smartphone ownership conducted in 2011. For individuals between the ages of 18 to 29, ownership of smart phones is at approximately 92%.

Mobile phones transmit and receive data wirelessly through communication networks such as a local area network (LAN), a general wide area network (WAN), and/or a public network. To communicate with these networks, antennas within these mobile phones receive and radiate Radio Frequency (RF) signals. Once the mobile phone is activated, the mobile phone is constantly transmitting and receiving RF electromagnetic frequency signals.

Many mobile phones are held close to the user's bodies and/or heads when in use. For example, when talking on a mobile phone, the user may hold the mobile phone close to the user's head/ear/brain/eyes. Many users store and hold their mobile phones in their pocket next to their body. Thus, the antennas of the mobile phones that radiate the RF electromagnetic frequency signals may lead to greater exposure and absorption of radiation by the users head and body.

Studies have been conducted and continue to be conducted regarding the health concerns of RF electromagnetic frequency signals being radiated from mobile phones. These studies have focused on the negative long term effects of radiation on people and its' medical complications. Some study results have shown that the penetration level of radiation is more dangerous and has more negative health effects in children than adults. Children's nervous systems are still developing and, therefore, more vulnerable to factors that may be possibly carcinogenic. Their heads are smaller than those of adults and they have thinner brain tissues and bones and consequently have a greater proportional exposure to the field of radio frequency radiation that is emitted by mobile phones. Children also have the potential of accumulating more years of mobile phone exposure than adults. Several studies are currently being conducted regarding the potential health effects of radiation on brain electrical activity, joint pain, heart rate, blood pressure, immune system, possible carcinogenic affects. The World Health Organization has classified mobile phone radiation as a Class 2B Possible Carcinogen.

Because of the potential effect of radiation from mobile phones, the FCC requires limiting the radiation from a portable communication device (such as a mobile or cellular telephone) that is directed towards a user's head (Specific Absorption Rate, or SAR). Further, warnings are placed inside the boxes of all mobile phone instruction booklets warning users to keep mobile phones certain distances away from the users' head and bodies due to the harmful effects of the electromagnetic RF radiation.

Attempts have been made to redirect the RF radiation away from the body of a user when using mobile phones. For example, protective cases have been created which may be placed onto a mobile phone to try and redirect the RF radiation away from the body of a user. The RF shielding used to redirect the RF radiation away from the body of a user is built into the protective case. The problem with the unmovable and permanent placement of the RF shielding in these cases is that the RF shielding cannot be removed, moved or adjusted in order to be more protective to the user. All mobile phones are not alike and the placement of shielding must be appropriately placed specific to the location of the antennas in each mobile phone to reflect/deflect the electromagnetic RF radiation directed towards the user. Further, if a user wishes to change the protective cover on a mobile phone, the new protective cover must also have the RF shielding built into the new protective cover. Otherwise, the new protective cover will not redirect the radiation away from the body of a user. Unfortunately, these covers are a 'one size/style fits all' and not appealing to the millions of people that use mobile phones. Most children, teens and adults personally identify with their mobile phones and choose and change the cases/covers according to their moods, feelings, beliefs, clothes, favorite characters, favorite colors, style, etc. The covers/cases are actually a status and personality symbol to most mobile phone users and these cases are changed quite often. Most decorative and/or protective covers do not have any RF shielding. Thus, individuals are limited to the decorative and/or protective covers they may purchase.

Other attempts have been made to reduce and/or redirect the RF radiation away from the body of a user when using mobile phones by placing circuitry or other shielding devices within the mobile phones. However, the circuitry being placed within the mobile phones only reduce the RF radiation to certain predefined levels. The circuitry can only reduce the RF radiation to certain predefined levels inside the mobile phones; otherwise the mobile phone will no longer be able to effectively communicate with the networks. Further, the circuitry only reduces the RF radiation and does not actually block and/or shield the body from the RF radiation. With regards to the shielding devices built within the mobile phones, many of the shielding devices are not meant to reduce and/or redirect the RF radiation away from the body of a user. Instead, many of the shielding devices are used to prevent RF interferences between components of the mobile phone.

Therefore, it would be desirable to provide a system and method that overcomes the above. The system and method would deflect and/or reflect RF radiation away from the body of the mobile phone user with the use of a metallic plate to shield electromagnetic RFs between the mobile phone and the user. This will significantly reduce the absorption, by the user, of the electromagnetic RF radiation. The system and method would be adjustable to meet the RF shielding needs of the specific mobile phone and transferable between any decorative and/or protective cover/case placed on the mobile phone thereby allowing the mobile phone user to choose any decorative and/or protective cover/case he/she desires.

SUMMARY

In accordance with one embodiment, a device for deflecting electromagnetic radio frequency (RF) radiation away from a user of a mobile phone is disclosed. The device has a metallic plate configured to be positioned between the mobile phone and at least one of a decorative or protective cover. The metallic plate is positioned over a rear surface of the mobile phone. The metallic plate is removable and non-permanently attached to the mobile phone and the at least one of decorative or protective cover.

In accordance with one embodiment, a device for deflecting radio frequency (RF) radiation away from a user of a mobile phone is disclosed. The device has a metallic plate configured to be positioned between the mobile phone and a cover portioned over a rear surface of the mobile phone. The metallic plate is removable and non-permanently attached to the mobile phone and the cover. The metallic plate comprises a copper plate configured to cover the rear surface of the mobile phone where RF signals are radiating from the mobile phone when the mobile phone is receiving/transmitting RF signals. A powder coating is formed over the copper plate.

In accordance with one embodiment, a device for deflecting radio frequency (RF) radiation away from a user of a mobile phone is disclosed. The device has a metallic plate configured to be positioned between the mobile phone and a cover portioned over a rear surface of the mobile phone. The metallic plate is removable and non-permanently attached to the mobile phone and the cover. The metallic plate comprises a copper plate configured to cover the rear surface of the mobile phone where RF signals are radiating from when the mobile phone is receiving/transmitting RF signals. A powder coating is formed over the copper plate. A clear coat is formed over the powder coating. A slip resistant material is applied to at least one surface of the clear coat.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method disclose a device that reflects and/or deflects RF radiation emitted from a mobile phone. The device fits between the mobile phone and a decorative and/or protective case. The device allows for mobile phone users to use whatever decorative and/or protective case they may choose, and, is easily transferable to other decorative and/or protective cases and easily movable to accommodate each mobile phones unique function and design in order to protect the user from the electromagnetic RF radiation emitting areas.

Figure 1:
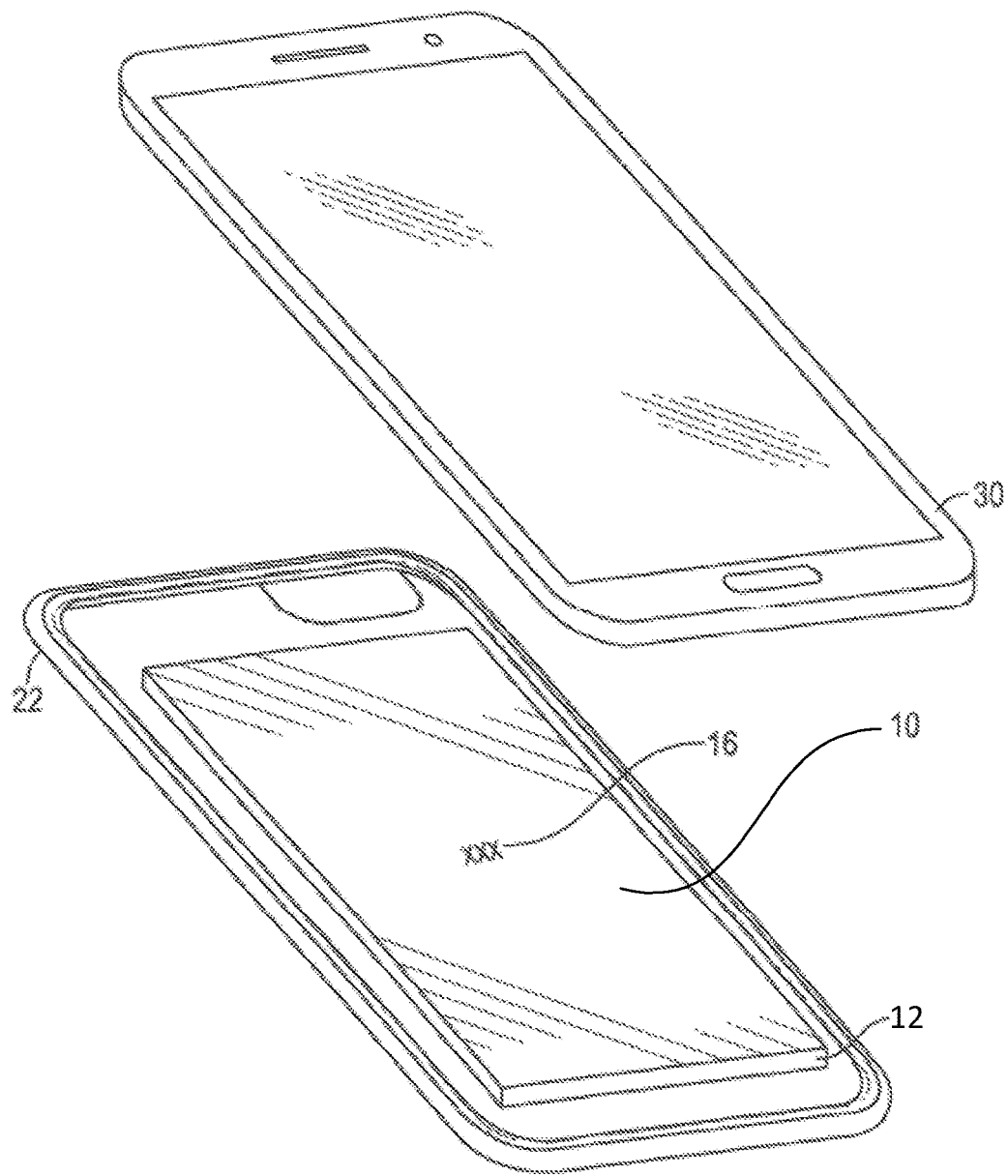
FIG. 1 is a perspective view of an RF shielding device positioned within a decorative and/or protective case for a mobile phone in accordance with one embodiment of the present invention.

Referring to FIG. 1, an RF shielding device 10 may be seen. The RF shielding device 10 may be comprised of a plate 12. The plate 12 may be formed of a sheet of metallic material. Different metallic materials may be used. For example, aluminum, pre-tin plated steel, alloy 770 or like materials may be used to form the plate 12 of the RF shielding device 10. In accordance with one embodiment, the plate 12 may be formed of copper. Copper is highly effective in attenuating magnetic and electrical waves thereby allowing the RF shielding device 10 to reduce the electromagnetic radiation emitted from the mobile phone 30.

The RF shielding device 10 may be formed in different sizes. The size of the RF shielding device 10 may be based on the mobile phone 30 and the location of antennas within the mobile phone 30. For example, some mobile phones 30 may have one or more antennas located only in one area such as in the top or bottom of the mobile phone 30. Thus, the RF shielding device 10 and hence the plate 12 may be sized to cover a lower and/or upper area of the mobile phone 30. In this embodiment, the plate 12 may be sized and shaped similar to that of a credit card. However, some mobile phones 30 may have multiple antennas located at the top and bottom of the mobile phone 30. For example, some mobile phones have four antennas, wherein one antenna is located in each corner (upper left, upper right, lower left and lower right corners). For these types of mobile phones 30, the plate 12 may be sized to cover the entire rear surface of the mobile phone 30. The above are given as examples and should not be seen in a limiting manner. Other configurations may be formed without departing from the spirit and scope of the present invention. For example, a small cut out may be formed on the RF shielding device 10 to prevent the RF shielding device 10 from obscuring a camera lens opening formed in the mobile phone 30.

When copper is used for forming the plate 12, the copper plate 12 may have a tendency to corrode. Copper corrosion may occur when the copper plate 12 is exposure to the atmosphere/air. Copper oxidization may cause the copper plate 12 to tarnish. After some time, the copper plate 12 may turn to a dark brown or black color, and finally to green. The oxidation of the copper plate 12 may cause the RF shielding device 10 to disfigure/damage the mobile phone 30.

Figure 4:
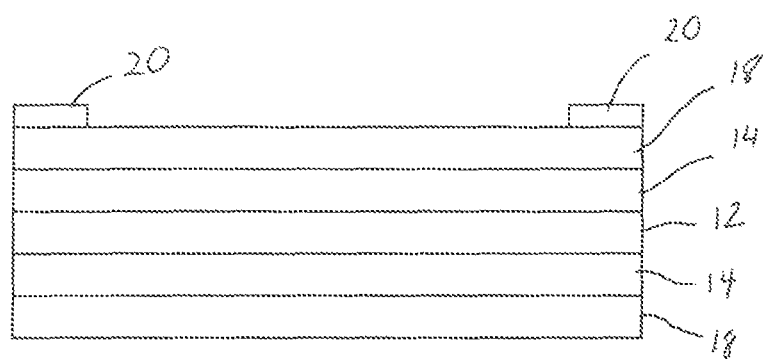
FIG. 4 is a cross-sectional view of the RF shielding device for a mobile phone in accordance with one embodiment of the present invention.

Referring to FIG. 4, because of the oxidization issue, the plate 12 may be powder coated. Powder coating is a process wherein a coating 14 may be electrostatically applied to the plate 12 and then cured under heat forming the coating 14 over the plate 12. The coating 14 may be a thermoplastic or a thermoset polymer and may come in any color. The coating 14 may create a hard finish on the plate 12 that is tougher more effective in preventing corrosion than conventional paint.

Different text, design and/or other indicia 16 (FIG. 1) may be formed on the plate 12 after the coating 14 has been applied. The text, design and/or other indicia 16 may allow one to personalize the RF shielding device 10. A clear coat 18 may be applied over the coating 14.

A slip resistant material 20 may be applied to the clear coat 18. The slip resistant material 20 may keep the RF shielding device 10 from sliding and moving as may be disclosed below.

Figure 2:
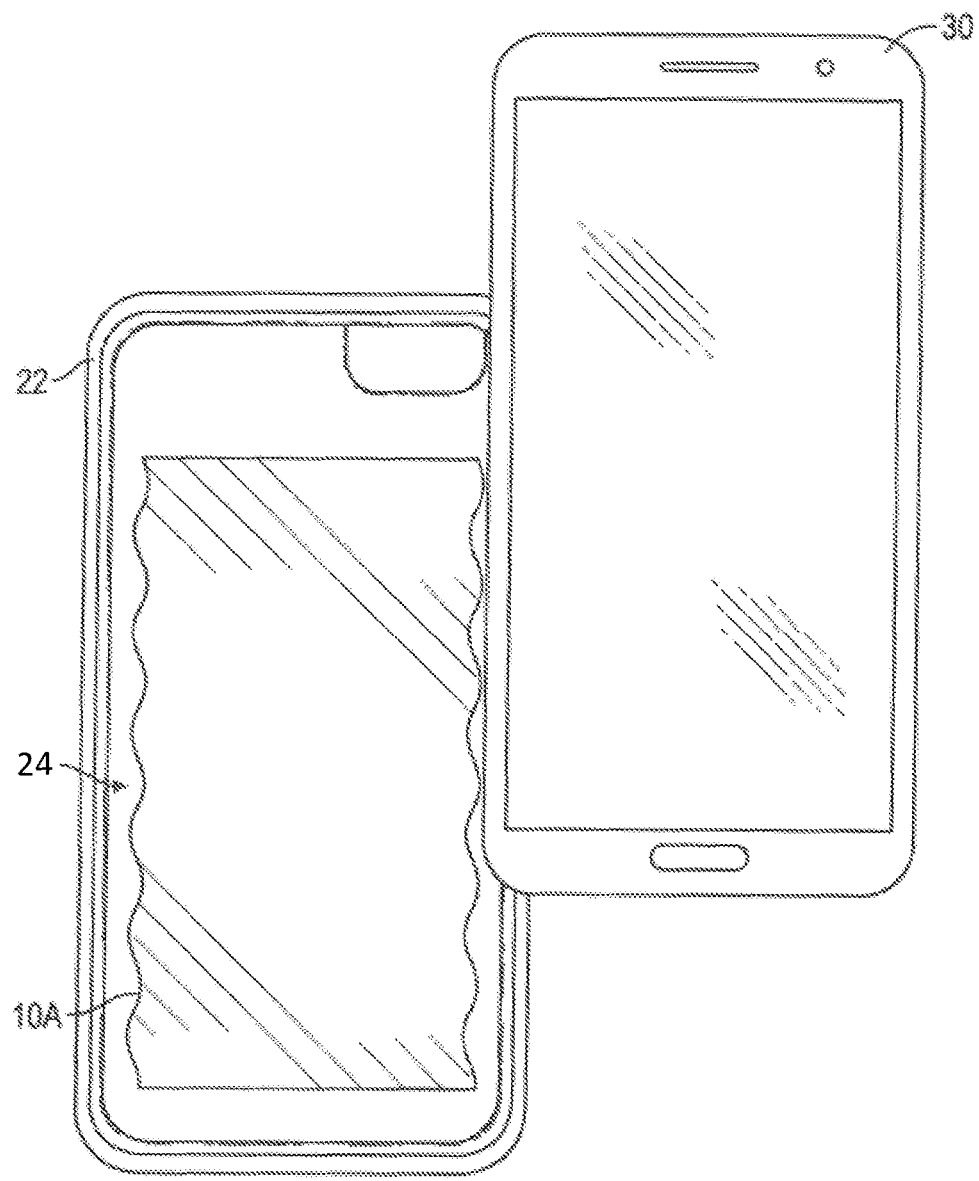
FIG. 2 is a front view of an RF shielding device positioned within a decorative and/or protective case for a mobile phone in accordance with one embodiment of the present invention.
Figure 3:
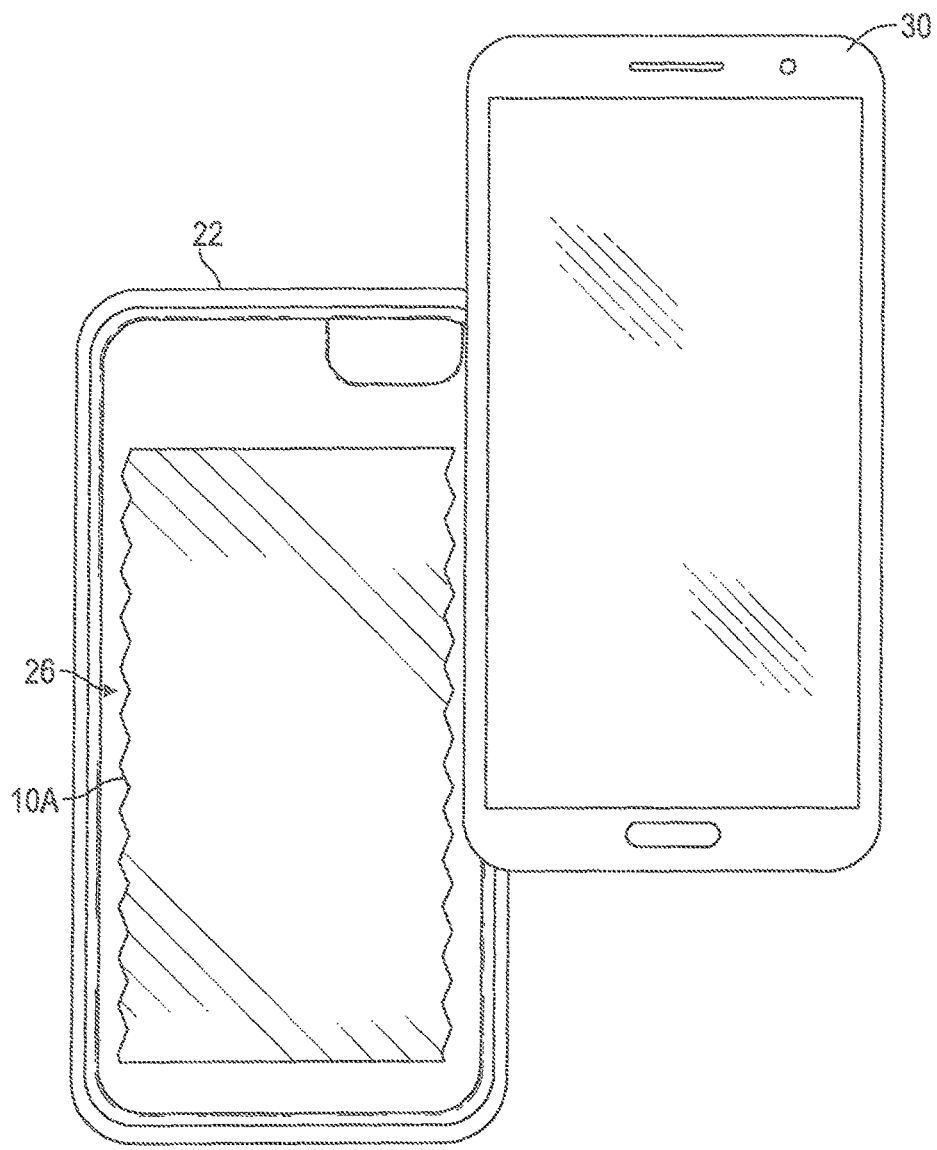
FIG. 3 is a front view of an RF shielding device positioned within a decorative and/or protective case for a mobile phone in accordance with one embodiment of the present invention.

Referring to FIGS. 1-3, the RF shielding device 10 may be formed in different sizes, shapes and configurations. FIG. 1 shows one embodiment where the RF shielding device 10 may be rectangular in shape and having a sufficient thickness to keep the RF shielding device 10 positioned between the mobile phone 30 and a decorative and/or protective cover 22 as will be discussed below. In accordance with one embodiment, the RF shielding device 10 may have a thickness of around $1/32$ to $1/8$ of an inch.

The RF shielding device 10 may be formed to have a wave configuration 24 formed on the edges 10A (top, bottom, left and right side edges) of the RF shielding device 10 as may be seen in FIG. 2. The RF shielding device 10 may be formed to have a saw tooth configuration 26 formed on the edges 10A (top, bottom, left and right side edges) of the RF shielding device 10 as may be seen in FIG. 3. The wave configuration 24 and the saw tooth configuration 26 formed on the edges 10A may affect the levels of the electromagnetic radiation emitted from the mobile phone 30.

In operation, a user wishing to reduce electromagnetic radiation emitted from the user's mobile phone 30 may need to determine the location of the one or more antennas within the mobile phone 30. When the user determines the location of the antennas, the user may position the RF shielding device 10 on a rear surface of the mobile phone 30 such that the RF shielding device 10 is positioned over the area where the antennas may be located. The user may position the RF shielding device 10 so that the slip resistant material 20 is placed against the rear surface of the mobile phone 30. This may prevent the RF shielding device 10 from shifting and moving around. The decorative and/or protective cover 22 may then be placed onto the mobile phone 30 securing the RF shielding device 10 between the mobile phone 30 and the decorative and/or protective cover 22.

The RF shielding device 10 is designed to reflect and/or deflect electromagnetic radiation emitted from the mobile phone 30. Unlike any other mobile phone radiation deflecting product on the market, the RF shielding device 10 fits between the mobile phone 30 and the decorative and/or protective cover 22 and is easily transferable, unlike a sticker or adhesive which needs to be removed, reapplied and may leave a sticky residue and which may not work as well nor be as effective due to the necessity of the removal and reapplication, and is not built-in to the decorative and/or protective cover 22. This may allow a user of the RF shielding device 10 to change out and use any decorative and/or protective cover 22 he/she may want with the RF shielding device 10 in order to be able to deflect the electromagnetic radiation from the mobile phone 30.

The foregoing description is illustrative of particular embodiments of the application, but is not meant to be a limitation upon the practice thereof. The following claims, including all equivalents thereof, are intended to define the scope of the application.

What is claimed is:

1. A device for deflecting radio frequency (RF) radiation away from a user of a mobile phone comprising:
   a metallic plate configured to be positioned between the mobile phone and at least one of a decorative or protective cover, the metallic plate positioned over a rear surface of the mobile phone, wherein the metallic plate is removable and non-permanently attached to the mobile phone and the at least one of a decorative or protective cover and wherein the metallic plate includes:
   a copper plate; and
   a powder coating formed over the copper plate.

2. The device of claim 1, wherein the copper plate is configured to cover an entire area of the rear surface of the mobile phone.

3. The device of claim 1, wherein the metallic plate comprises a clear coat formed over the powder coating.

4. The device of claim 3, wherein the metallic plate comprises a slip resistant material applied to at least one surface of the clear coat.

5. The device of claim 1, wherein the metallic plate comprises indicia formed on the powder coating.

6. The device of claim 1, wherein the copper plate has undulating edges.

7. The device of claim 1, wherein the copper plate has saw-tooth edges.

8. The device of claim 1, wherein the copper plate has a thickness of $1/32$ to $1/8$ inches.

9. A device for deflecting electromagnetic radio frequency (RF) radiation away from a user of a mobile phone comprising:
   a metallic plate configured to be positioned between the mobile phone and a cover portioned over a rear surface of the mobile phone, wherein the metallic plate is removable and non-permanently attached to the mobile phone and the cover, wherein the metallic plate includes:
   a copper plate configured to cover the rear surface of the mobile phone where RF signals are radiating from the mobile phone when the mobile phone is receiving/transmitting RF signals; and
   a powder coating formed over the copper plate.

10. The device of claim 9, wherein the metallic plate comprises a clear coat formed over the powder coating.

11. The device of claim 10, wherein the metallic plate comprises a slip resistant material applied to at least one surface of the clear coat.

12. The device of claim 9, wherein the metallic plate comprises indicia formed on the powder coating.

13. The device of claim 9, wherein the copper plate has undulating edges.

14. The device of claim 9, wherein the copper plate has saw-tooth edges.

15. The device of claim 9, wherein the copper plate has a thickness of $1/32$ to $1/8$ inches.

16. A device for deflecting radio frequency (RF) radiation away from a user of a mobile phone comprising:
  a metallic plate configured to be positioned between the mobile phone and a cover portioned over a rear surface of the mobile phone, wherein the metallic plate is removable and non-permanently attached to the mobile phone and the cover, wherein the metallic plate includes:
  a copper plate configured to cover the rear surface of the mobile phone where RF signals are radiating from when the mobile phone is receiving/transmitting RF signals;
  a powder coating formed over the copper plate;
  a clear coat formed over the powder coating; and
  a slip resistant material applied to at least one surface of the clear coat.

17. The device of claim 16, wherein the metallic plate comprises indicia formed on the powder coating.

18. The device of claim 16, wherein the copper plate has undulating edges.

19. The device of claim 16, wherein the copper plate has saw-tooth edges.

20. The device of claim 16, wherein the copper plate is rectangular in shape.

* * * * *